United States Patent
Sechrist

(10) Patent No.: US 7,846,402 B2
(45) Date of Patent: Dec. 7, 2010

(54) SCREENLESS REACTOR FOR GRANULAR MOVING BED

(75) Inventor: Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 515 days.

(21) Appl. No.: 11/941,553

(22) Filed: Nov. 16, 2007

(65) Prior Publication Data

US 2009/0130002 A1     May 21, 2009

(51) Int. Cl.
*B01J 8/12* (2006.01)
*B01J 8/34* (2006.01)

(52) U.S. Cl. .................. 422/216; 422/220; 422/228; 422/229; 34/165; 34/171; 34/173; 34/178

(58) Field of Classification Search ........................ None
See application file for complete search history.

(56) References Cited

U.S. PATENT DOCUMENTS

| 4,017,278 | A | | 4/1977 | Reese | 55/96 |
| 4,053,141 | A | * | 10/1977 | Gussefeld | 366/339 |
| 4,126,435 | A | | 11/1978 | Reese | 55/474 |
| 5,130,106 | A | | 7/1992 | Koves et al. | 422/216 |
| 5,209,908 | A | | 5/1993 | Koves et al. | 422/218 |
| 6,431,528 | B1 | * | 8/2002 | Kojima | 261/79.2 |
| 6,569,389 | B1 | | 5/2003 | Koves et al. | 422/219 |

* cited by examiner

*Primary Examiner*—Jennifer A Leung
(74) *Attorney, Agent, or Firm*—Mark Goldberg

(57) ABSTRACT

A screenless reactor design is presented. The reactor includes a series of overlapping vanes where solid catalyst can cascade down the vanes. Gas flows across the catalyst by flowing through the vanes contacting the catalyst and then disengaging from contact with the solid catalyst particles.

5 Claims, 2 Drawing Sheets

SCREENLESS REACTOR FOR GRANULAR MOVING BED

BACKGROUND OF THE INVENTION

This invention relates to the field of fluid particle contact and to an apparatus for contacting fluids and particles. More specifically, this invention relates to a moving bed of particles with a cross-flowing fluid.

A wide variety of processes use radial flow reactors to provide for contact between a fluid and a solid. The solid usually comprises a catalytic material on which the fluid reacts to form a product. The processes cover a range of processes, including hydrocarbon conversion, gas treatment, and adsorption for separation.

Radial flow reactors are constructed such that the reactor has an annular structure and that there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. Solid catalyst particles are added at the top, and flow through the apparatus and removed at the bottom, while passing through a screened-in enclosure that permits the flow of fluid over the catalyst. The screen is preferably constructed of a non-reactive material, but in reality the screen often undergoes some reaction through corrosion, and over time problems arise from the corroded screen or mesh.

The screens or meshes used to hold the catalyst particles within a bed are sized to have apertures sufficiently small that the particles cannot pass through. A significant problem is the corrosion of meshes or screens used to hold catalyst beds in place, or for the distribution of reactants through a reactor bed. Corrosion can plug apertures to a screen or mesh, creating dead volumes where fluid does not flow. Corrosion can also create larger apertures where the catalyst particles can then flow out of the catalyst bed with the fluid and be lost to the process increasing costs. This produces unacceptable losses of catalyst, and increases costs because of the need to add additional makeup catalyst.

The design of reactors to overcome these limitations can save significantly on downtime for repairs and on the loss of catalyst, which is a significant portion of the cost of processing hydrocarbons.

SUMMARY OF THE INVENTION

A solution to the problem of corrosion and screen plugging in a moving bed reactor can be accomplished with a new reactor design. The reactor allows for catalyst to flow through a reactor over a plurality of vanes, while allowing gas to flow across the catalyst when the gas flows counter current to the catalyst. The reactor comprises a plurality of overlapping vanes positioned within the reactor. The vanes have side edges affixed to supports, such as the reactor wall, or a center support for a cylindrically shaped reactor. The vanes further have a leading edge and a trailing edge, where the leading and trailing edges are relative to the direction of flow of catalyst. Each vane has a trailing edge that overlaps the vane below it, and has a leading edge that is overlapped by the vane above it. The reactor further includes a catalyst inlet at the top of the reactor, a catalyst outlet at the bottom of the reactor, a gas inlet at the bottom of the reactor, and a gas outlet at the top of the reactor. The vanes are oriented at an angle between 0 and 60 degrees from horizontal with the leading edge above the trailing edge. The spacing of the vanes allows free flow of gas between the vanes, while the overlap of the vanes prevents the catalyst from freely flowing between the vanes with the catalyst cascading from one vane to the next vane below it.

Other objects, advantages and applications of the present invention will become apparent to those skilled in the art from the following detailed description and drawings.

DETAILED DESCRIPTION OF THE INVENTION

There are many processes that involve the contacting of a fluid with a solid. Moving bed reactors are one such apparatus used in some of these processes. The moving bed reactors comprise a containment device with screens for allowing fluid to flow across. The screens are designed to have sufficiently small openings, or slots, to prevent the flow of solids through the screens as the solids move through the reactors. As many of the processes develop and improve, and the operating conditions become more severe to increase yields, the openings are subject to plugging from coke and/or the deposit of corrosion products. This is especially true in the hydrocarbon processing industry where sulfur compounds are reacted and removed from hydrocarbon streams. This limits the life of some of the reactor internals and increases downtime for the replacement of screens. The development of a reactor design that does not use screens improves the performance.

Figure 1:
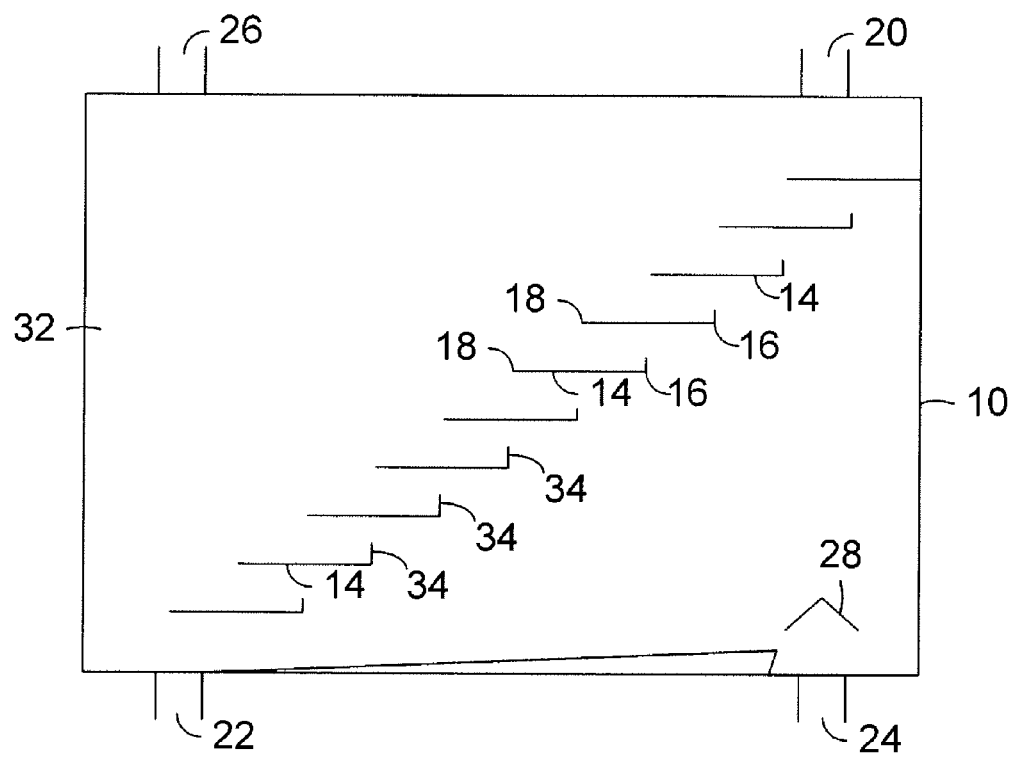
FIG. 1 is a cross section of a reactor that has a rectangular construction.

The present invention comprises a moving bed reactor that has no screens. The reactor comprises a plurality of overlapping vanes disposed within a reactor housing. The invention allows for the catalyst to cascade down a series of vanes while the fluid percolates upward and through the cascading catalyst. In one embodiment, as shown in FIG. 1, the apparatus comprises a housing 10 having a substantially rectilinear shape and that has a front wall, a back wall, and two side walls. The apparatus includes a plurality of vanes 14 disposed within the housing where each vane has a first side edge affixed to a side wall, and a second side edge affixed to the opposing side wall. Each vane 14 has a leading edge 16 and a trailing edge 18. The leading edge 16 and trailing edge 18 are with respect to the stream-wise flow of solids through the reactor, where the solid will flow across the vane 14 and over the trailing edge 18. The leading edge 16 of the uppermost vane 14 can be affixed to the back wall of the reactor, and the trailing edge 18 of each vane overlaps in a horizontal position the leading edge 16 of the vane 14 that is nearest and below it. This continues for each vane 14 until the last vane 14 in the reactor. The last vane 14 is not above any other vane 14 and the trailing edge 18 of the last vane 14 directs solid into a solid collection zone. While it is envisioned that the vanes 14 have a substantially planar structure, it is also contemplated that the vanes 14 can be curved or have any geometric configuration that maintains the basis of a series of overlapping structures.

The housing 10 includes an inlet opening 20 at the top for the admittance of solid particles and an outlet opening 22 at the bottom for the withdrawal of solid particles. The reactor is a fluid solid contacting reactor, and therefore the reactor includes a fluid inlet opening 24 at the bottom of the housing 10 and a fluid outlet opening 26 at the top of the housing 10.

In one embodiment, the reactor can include a shroud 28 over the fluid inlet 24, and the bottom 30 of the reactor will be sloped to direct any solids to the solids outlet opening 22. Although it is not envisioned that many solids will flow between the vanes 14, the shroud 28 provides protection against solids entering the fluid inlet 24, and provides a means to redirect solids that pass through the vanes during an operational upset.

Typically, this reactor is for corrosive systems wherein the reactants and/or products are corrosive to the screens that hold the solid catalyst particles flowing through the reactor. The reactions can plug screens thereby causing flow maldistributions and dead zones, and in addition, corrosive reactions can destroy parts of the screens that would subsequently allow for material to pass through the screens, thereby causing a loss of catalyst. This is expensive and increases maintenance and downtime of the reactor to remedy plugging and corrosion. The present design provides for continuous uniform contact between the fluid and the catalyst, and allows for good separation of the catalyst from the fluid before the fluid is removed from the reactor.

A feature of this invention is that there is a large gas disengaging space 32 above the solids, where solid particles separate from the flow of fluid and drop back onto the bed of solids as the particles move through the apparatus. The present reactor provides for continuous flow of solids through the reactor and continuous flow of fluid, usually a gas, across the solid catalyst particles. The fluid, after contacting the solid, enters a disengagement zone 32 where the solid particles separate from the fluid.

In one embodiment, the vanes 14 further include a baffle 34. The baffle is disposed proximate to the leading edge 16 of the vane such that the baffle is below the vane 14 directly above it. In a preferred position, the baffle is positioned at the leading edge 16. While the baffle can be disposed at any angle relative to the plane of the vane 14, it is preferred that the baffle be disposed at a substantially perpendicular orientation to the plane of the vane 14. The baffle provides a secondary means for preventing the flow of catalyst against the flow of fluid in the space between neighboring vanes 14.

In another embodiment, the apparatus can further include a second set of vanes (not shown). The second set of vanes can be disposed in a manner similar to the first set of vanes as described above, but either above the first set, or below the first set. The second set of vanes provides for additional fluid inputs, or for additional contact time between the fluid and the catalyst.

Figure 2:
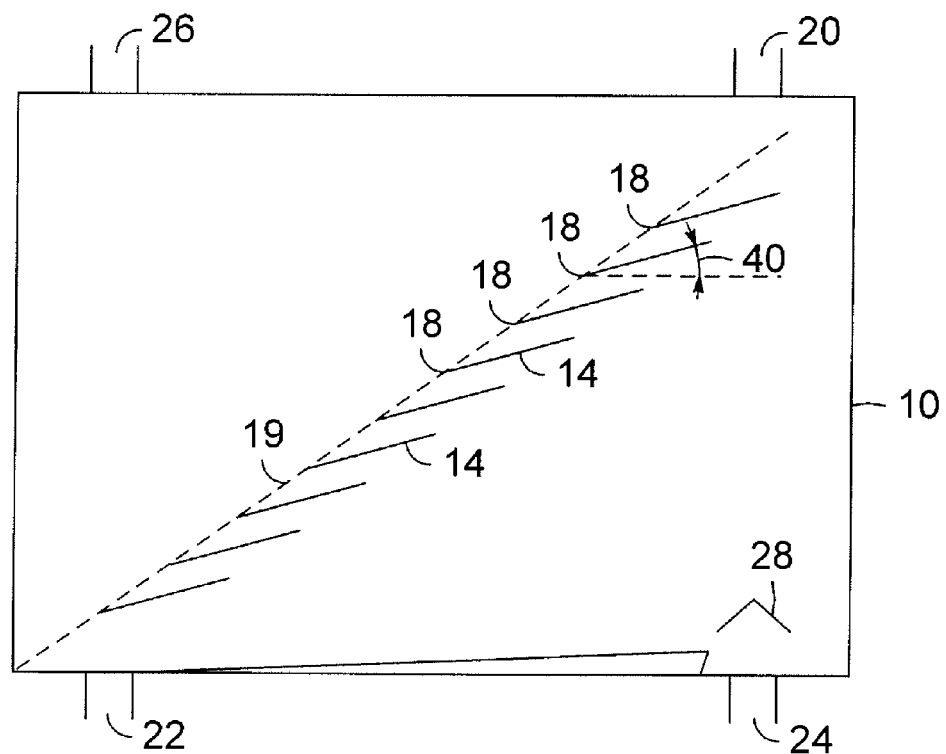
FIG. 2 is a cross section of a reactor with a rectangular construction with angled vanes.

The vanes 14 are oriented to facilitate the flow of solids through the reactor, and to control the residence time of the catalyst within the reactor. As shown in FIG. 2, the vanes 14 can be oriented at an angle 40 between 0 degrees and 60 degrees relative to horizontal. In a preferred orientation, the vanes 14 are oriented at an angle 40 between 10 degrees and 30 degrees relative to horizontal. The angling of the vanes 14 assist in preventing the holdup of catalyst as the catalyst flows through the reactor, and further limits the backflow of catalyst through the gaps between the vanes 14.

The catalyst flows down the vanes 14 in a cascade manner. The top surface of the catalyst, as it flows onto the topmost vane 14 will be close to the angle of repose for the flowing catalyst. The horizontal spacing of the vanes 14 is preferred such that the trailing edges 18 form a line 19 connecting the trailing edges 18. The line 19 is preferably at an angle relative to the horizontal that is close to the angle of repose for the flowing catalyst. This provides a relatively uniform bed thickness as the catalyst flows through the reactor.

Figure 3:
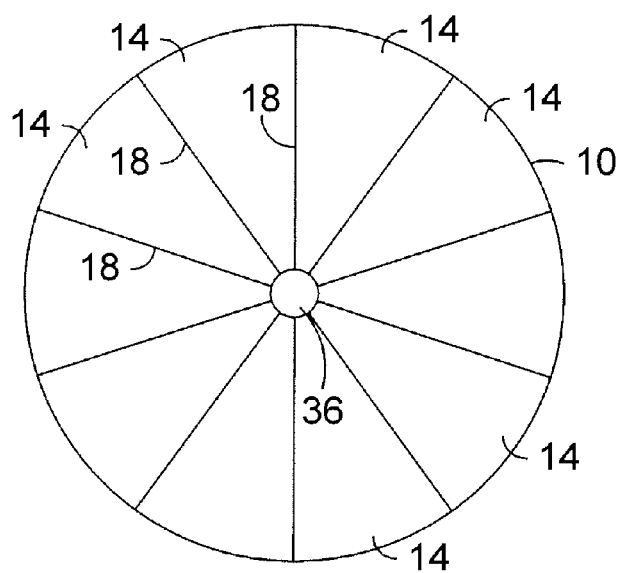
FIG. 3 is a top view of a cylindrically shaped reactor.
Figure 4:
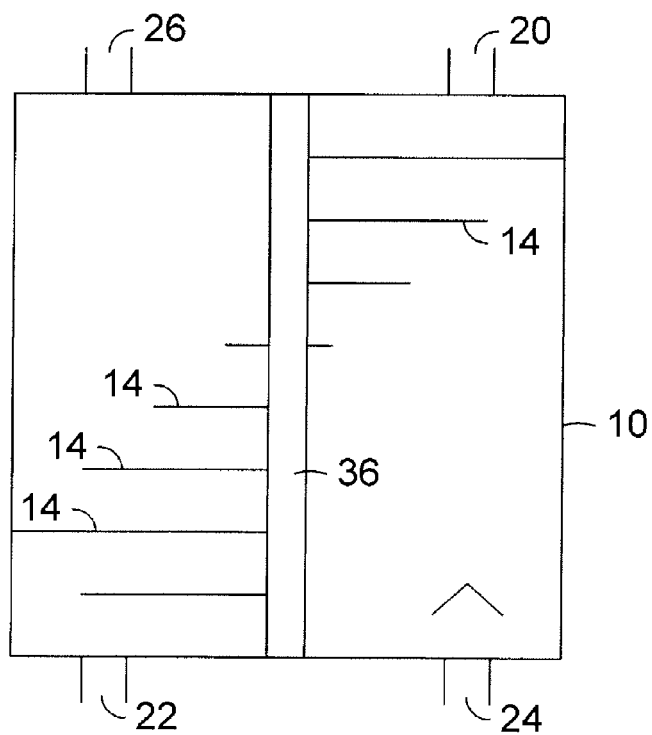
FIG. 4 is a cross section view of a cylindrically shaped reactor.

In another embodiment, the reactor has a cylindrical structure. The reactor housing 10 is a cylindrical housing 10 with a center support 36, and a plurality of vanes 14 disposed within the housing 10 in a spiral staircase orientation. The vanes 14 are arrayed such that each vane has a leading edge 16 and a trailing edge 18, with trailing edge 18 of a vane overlapping the leading edge 16 of a vane 14 below it. A cross-section view across the longitudinal direction and from above the cylindrically shaped reactor is shown in FIG. 3, where the vanes 14 show the trailing edge 18 of the vanes, and the leading edges 16 are hidden by the vanes 14 above them. In a cross-section of the reactor 10 through the center support 36 in the longitudinal direction shown in FIG. 4 displays the orientation of the vanes 14 relative to one another. The vanes 14 wind around the center support 36, and have a side edge affixed to the center support 36 with an opposing side edge affixed to the inside wall of the cylindrical housing 10.

The spacing of the vanes 14 is such that there is overlap to prevent the catalyst flowing through the reactor from passing through the gap between neighboring vanes 14. The gap, or spacing, between neighboring vanes 14 is greater than the size of the solid catalyst particles. This provides for a free flow of fluid through the reactor and across the flowing catalyst. The vanes 14 are preferably angled to facilitate the flow of catalyst in one direction across the vanes 14. Also, the horizontal spacing of the vanes 14 is preferred such that a line formed through the trailing edges 18 of the vanes 14 is at an angle close to the angle of repose for the flowing catalyst.

The cylindrical structure of this embodiment lends itself to a second plurality of vanes (not shown) disposed within the housing. The second plurality of vanes is a second spiral of vanes in a similar orientation as the first plurality of vanes, except for a vertical displacement. With the second plurality of vanes, there are two helixes of vanes formed spiraling around the center support. The vanes in the second plurality each has a leading edge, a trailing edge, a first side and a second side. The first side is affixed to the center support and the second side is affixed to the cylindrical housing. The vanes are arrayed such that the trailing edge of each vane overlaps the leading edge of the vane nearest and below it in the second plurality of vanes. The leading edge and trailing edge are with respect to the flow of catalyst through the reactor, such that the catalyst flows down onto the vane, along the vane and over the trailing edge of the vane.

The vanes 14 can include a baffle 34 disposed proximate to the leading edge 16 of the vane 14. The orientation of the vanes 14 is such that when a baffle 34 is affixed to the vanes 14, the baffle 34 is in a position on the vane 14 to be below the next nearest vane 14 above it. The baffle 34 is preferably affixed in a substantially perpendicular orientation to the vane 14 to which it is affixed.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. An apparatus for contacting a fluid with a moving bed of solids comprising:
   a cylindrical housing having a center support;
   a plurality of vanes, wherein each vane has a leading edge, a trailing edge, a first side and a second side, and where the first side is affixed to the center support, and the second side is affixed to the cylindrical housing, and the vanes are arrayed at different elevations in a spiral orientation within the housing with the trailing edge of each vane overlapping the leading edge of the nearest vane below it wherein each vane below the uppermost vane includes a baffle disposed proximate to the leading edge of the vane.

2. The apparatus of claim 1 wherein each vane is oriented at an angle between 0 degrees and 60 degrees relative to horizontal.

3. The apparatus of claim 2 wherein each vane is oriented at an angle between 10 degrees and 30 degrees relative to horizontal.

4. The apparatus of claim 1 further comprising a second plurality of vanes wherein each vane has a leading edge, a trailing edge, a first side and a second side, and where the first side is affixed to the center support, and the second side is affixed to the cylindrical housing, and the second plurality of vanes are arrayed at different elevations in a spiral orientation within the housing with the trailing edge of each vane in the second plurality of vanes overlapping the leading edge of the nearest vane in the second plurality of vanes below it.

5. The apparatus of claim 1 wherein the baffle is disposed substantially perpendicularly to the vane.

\* \* \* \* \*